United States Patent
Wigren et al.

(10) Patent No.: US 8,923,886 B2
(45) Date of Patent: Dec. 30, 2014

(54) PRE-SCALING OF A-GPS POSITIONING ACCURACY DATA

(75) Inventors: Torbjörn Wigren, Uppsala (SE); Ari Kangas, Lidingö (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 95 days.

(21) Appl. No.: 13/810,522

(22) PCT Filed: Jul. 19, 2010

(86) PCT No.: PCT/SE2010/050856
§ 371 (c)(1),
(2), (4) Date: Jan. 16, 2013

(87) PCT Pub. No.: WO2012/011855
PCT Pub. Date: Jan. 26, 2012

(65) Prior Publication Data
US 2013/0115973 A1  May 9, 2013

(51) Int. Cl.
*H04W 24/00* (2009.01)
*G01S 19/05* (2010.01)
*H04W 48/08* (2009.01)
*H04W 64/00* (2009.01)

(52) U.S. Cl.
CPC .............. *H04W 24/00* (2013.01); *G01S 19/05* (2013.01); *H04W 48/08* (2013.01); *H04W 64/00* (2013.01)
USPC .................. 455/456.2; 455/404.2; 455/550.1

(58) Field of Classification Search
CPC ..... H04W 64/00; H04W 12/12; H04W 4/025; H04W 4/02; H04W 4/206; G01S 19/42; G01S 19/48; G01S 19/29; G01S 5/0036; G01S 5/14; G06Q 30/0261
USPC .......................... 455/456.1–459, 404.2, 405
See application file for complete search history.

(56) References Cited

U.S. PATENT DOCUMENTS

2006/0258369 A1 * 11/2006 Burroughs et al. ......... 455/456.1
2014/0148202 A1 * 5/2014 Harper ....................... 455/456.6

OTHER PUBLICATIONS

International Search Report, PCT/SE2010/050856, Mar. 14, 2012.
3GPP TS 25.305 V9.0.0 (Dec. 2009); 3rd Generation Partnership Project; Technical Specification Group Radio Access Network; Stage 2 functional specification of User Equipment (UE) positioning in UTRAN (Release 9); retrieved from the Internet: http://www.3gpp.org/ftp/specs_/html-info/25305.htm; Chapters 6.6.1 and 6.6.4.1.

(Continued)

*Primary Examiner* — Chuong A Ngo
(74) *Attorney, Agent, or Firm* — Myers Bigel Sibley & Sajovec, P.A.

(57) ABSTRACT

A method in conjunction with positioning of a mobile terminal in a cellular telecommunication system is disclosed. According to the method, an end user's requested positioning accuracy for the positioning of the mobile terminal is determined (510). Also, an estimated confidence value for the positioning of the mobile terminal is determined (520), and so is a required confidence value for the end user (530). Then, a pre-scale value is produced (540) based on at least the estimated confidence value and the required confidence value. The pre-scale value is applied (550) to the requested positioning accuracy to obtain a pre-scaled requested positioning accuracy. Then, the pre-scaled requested positioning accuracy is sent (560) in the cellular telecommunication system towards the mobile terminal.

13 Claims, 4 Drawing Sheets

(56) References Cited

OTHER PUBLICATIONS

3GPP TS 25.413 V9.3.0 (Jun. 2010); 3$^{rd}$ Generation Partnership Project; Technical Specificaiton Gropu Radio Access Network; UTRAN lu interface Radio Access Network Application Part (RANAP) signalling (Release 9); Retrieved from the Internet: http://www.3gpp.org/ftp/specs/html-info/25413.htm; Chapter 8.19.2.

3GPP TS 25.331 V10.0.0 (Jun. 2010); 3$^{rd}$ Generation Partnership Project; Technical Specification Group Radio Access Network; Radio Resource Control (RRC); Protocol specification (Release 10); Retrieved from the Internet: http://www.3gpp.org/ftp/specs/html-info/25331.htm; Chapters 8.4.1.1, 8.4.2.1, 8.6.7, 8.6.7.19.1a and 8.6.7.19.1b.

* cited by examiner

PRE-SCALING OF A-GPS POSITIONING ACCURACY DATA

CROSS REFERENCE TO RELATED APPLICATION

This application is a 35 U.S.C. §371 national stage application of PCT International Application No. PCT/SE2010/050856, filed on 19 Jul. 2010, the disclosure and content of which is incorporated by reference herein in its entirety. The above-referenced PCT International Application was published in the English language as International Publication No. WO 2012/011855 A1 on 26 Jan. 2012.

TECHNICAL FIELD

The present invention relates to a method in conjunction with positioning of a mobile terminal in a cellular telecommunication system. The invention also relates to a node in a telecommunication system for performing the method, and to an associated computer program product and computer readable medium.

BACKGROUND

The global positioning system (GPS) is the most known system for positioning of a movable unit, such as a car, ship, or generally any entity or person provided with a positioning signal receiver. As is well known, GPS involves a plurality of satellites which orbit the Earth and transmit GPS ranging signals which are captured and analyzed by the GPS receiver to determine a current position with respect to the surface of the Earth.

Assisted GPS (A-GPS) positioning is an enhancement of GPS, specifically designed to facilitate integration of GPS receivers in mobile terminals for cellular communication systems. A number of GPS reference receivers are attached to the cellular communication system and serve to collect assistance data that, when transmitted to GPS receivers in mobile terminals connected to the cellular communication system, will enhance the performance of the terminals' GPS receivers. With A-GPS the search for GPS satellites may be rendered much faster in the GPS receiver, which is advantageous in devices like mobile terminals where the GPS functionality may not be constantly activated. When the GPS receiver starts up it will use the assistance data to determine an approximate indication of its current position and thus concentrate its search to certain satellites only rather than all satellites in the GPS system. A-GPS accuracy can become as good as 10 meters also without differential operation. The development of A-GPS was accelerated by the U.S. FCC's North American E-911 positioning mandate, requiring that the location of a cell phone be made available to emergency call dispatchers.

However, the integration of GPS and cellular telecommunication to obtain A-GPS has caused some problems. For instance, certain aspects of the 3GPP W-CDMA standard (which is the basis for the UMTS systems of today) have been found to impair end to end performance, in particular in North American E-911 positioning. Problems are caused by a too vague specification and signaling of what is meant by positioning accuracy. To understand this it is first noted that accuracy in the radio navigation field, in particular for A-GPS, is a random quantity. This means that any time a position uncertainty is determined, the uncertainty must be accompanied by a corresponding probability that the terminal is actually in the region defined by the reported position and the reported uncertainty. In the 3GPP W-CDMA specification uncertainty can be expressed in terms of an uncertainty circle, an uncertainty ellipse and an uncertainty ellipsoid. More specifically, one problem affecting A-GPS originates from 1. The fact that the 3GPP standard does not specify exactly how the uncertainty and the probability (also known as the confidence) are related. Typically this would require a specification stating how the confidence value shall be related to the covariance matrix of the uncertainty measure. In particular, this would require a different handling of 2- and 3-dimensional uncertainties.

2. The fact that the requested horizontal and vertical accuracies, that are received in the radio access network (RAN) from the central network (CN) (and the end user), do not specify the confidence for which the quality-of-service (QoS) request is valid.

3. The fact that the horizontal and vertical accuracies, that are transmitted from the radio network controller (RNC) to the terminal to specify the requested accuracy of the measured A-GPS result, are not accompanied by a confidence value.

4. The fact that the A-GPS result reported from the terminal to the RNC of the W-CDMA RAN normally contains horizontal accuracy and a corresponding confidence value, most often also a vertical accuracy.

5. The fact that shape conversions are applied in the RNC of the W-CDMA RAN, e.g. in order to scale the accuracies according to operator configured confidence values for reporting of positioning results.

Therefore, when the RNC of the W-CDMA RAN shall provide the terminal with requested accuracy information, the RNC neither knows nor can signal a correct confidence value to the terminal. As a consequence, the action in telecommunication systems known from the prior art has been to forward the incoming horizontal and vertical accuracy requirements to the terminal unaffected. Then the terminal tries to provide a result according to the request; however, this result is provided at the confidence level selected by the specific terminal type, not necessarily at the confidence level really needed by the end user. Therefore, the RNC of the W-CDMA RAN may perform a shape conversion to scale the obtained horizontal and vertical accuracies to the level that is configured for the specific service (e.g. as directed by the Client Type IE). It may then happen that the terminal provides a result, exactly at the received requested accuracy level, with the accuracy requested, and at a confidence level of typically 39% or 20% (2D and 3D covariance matrix level, respectively). In case of North American emergency positioning, 95% confidence is however required for reporting. Hence, in this case, the RNC would scale up the obtained horizontal and vertical accuracies, a fact that would result in a failure to meet the requested accuracies that were originally received from the CN and the end user. The fact that the QoS was not fulfilled may also be signaled to the end user, and it may also affect performance management counters. Both of these effects will yield statistics that in the end may be reported to the federal communication commission (the FCC) with the result that the operator's fulfillment of the regulatory E-911 requirements may be questioned.

The present inventors have realized that there is room for improvements with respect to these problems.

SUMMARY

It is accordingly an object of the invention to eliminate or alleviate at least some of the problems referred to above.

As a conceptual idea behind the invention, the present inventors have realized that pre-scaling functionality may be introduced that will scale the horizontal and vertical accuracy requirements originally received from the end user, before these accuracies are sent on towards the mobile terminal as requirements on the accuracy of the A-GPS positioning to be performed by the mobile terminal. This pre-scaling may be selected according to a configured best estimate of the confidence and uncertainty relation being used by a majority of the mobile terminals in the telecommunication system. The pre-scaling may also account for the type of service, which—in a W-DCMA/UMTS environment—for instance may be signaled by the Client Type IE in the W-CDMA RANAP LOCATION REPORTING CONTROL message.

This conceptual idea has been reduced to practice at least according to the aspects and embodiments of the invention referred to below.

One aspect of the present invention therefore is a method in conjunction with positioning of a mobile terminal in a cellular telecommunication system. The method comprises: determining an end user's requested positioning accuracy for the positioning of said mobile terminal; determining an estimated confidence value for the positioning of said mobile terminal; determining a required confidence value for said end user; producing a pre-scale value based on at least said estimated confidence value and said required confidence value; applying said pre-scale value to said requested positioning accuracy to obtain a pre-scaled requested positioning accuracy; and sending the pre-scaled requested positioning accuracy in said cellular telecommunication system towards said mobile terminal.

An advantage of the invention is that enhanced positioning accuracy may be obtained. Another advantage of the invention is a reduced risk for the requested QoS not being fulfilled.

In one or more embodiments, determining the end user's requested positioning accuracy involves: receiving a first control message in a node of said cellular telecommunication system, said first control message representing a request from said end user for a positioning report pertaining to said mobile terminal; and determining at least one accuracy code included in said first control message, wherein the or each determined accuracy code represents a radius of an uncertainty circle or an altitude.

The positioning of the mobile terminal may for instance be performed in accordance with any of the existing or future alternatives within A-GPS (Assisted GPS). In one embodiment, the cellular telecommunication system is compliant with W-CDMA (UMTS), and the node is a Radio Network Controller (RNC) which receives the first control message in the form of a Location Reporting Control message from the Core Network (CN) over the Radio Access Network Application (RANAP) protocol. In another embodiment, the cellular telecommunication system is compliant with LTE, wherein the node is an Evolved Serving Mobile Location Center (E-SMLC) which communicates with the CN over the LTE Positioning Protocol Annex (LPPa) protocol.

In one or more embodiments, determining the estimated confidence value for the positioning of said mobile terminal involves: analyzing said first control message to determine whether a horizontal accuracy code is included therein, and whether a vertical accuracy code is included therein; and, based upon said analyzing, selecting said estimated confidence value from a plurality of configured best estimates of confidences values known to be reported by mobile terminals in the cellular telecommunication system.

For instance, the configured best estimates of confidences values may be 39% in a 2D case (i.e. when only a horizontal accuracy code is included in the first control message, specifying a radius of an uncertainty circle); 20% in a 3D case (i.e. when both a horizontal and a vertical accuracy code are included in the first control message, specifying a radius of an uncertainty circle as well as an altitude), and 68% in a 1D case (i.e. when only a vertical accuracy code is included in the first control message, specifying an altitude).

In one or more embodiments, determining the required confidence value involves: analyzing said first control message to determine a service class of said end user; and determining said required confidence value based on the determined service class. In this regard, determining the required confidence value may further involve: reading a client type included in said first control message; and using a cross-reference table to map the client type into said required confidence value. In one embodiment, where the first control message is a Location Reporting Control message, the client type is the Client Type IE of this message. Thus, the cross-reference table may contain a list which maps all or some of the different possible Client Type IE values (e.g. Emergency Services, Value Added Services, PLMN Operator Services, Lawful Intercept Services, PLMN Operator Broadcast Services, PLMN Operator Operation and Maintenance Services, PLMN Operator Anonymous Statistics Services, PLMN Operator Target MS Services Support) into corresponding required confidence values between 0 and 100%. For instance, Emergency Services may be mapped to a required confidence value of 95%.

In one or more embodiments, producing a pre-scale value involves: analyzing said first control message to determine whether a horizontal accuracy code is included therein whereas a vertical accuracy code is not included therein; and, if so, calculating said pre-scale value $v_{PS}$ as $1/\text{sqrt}(-2*\log(1-C_{Required}))$, where $C_{Required}$ is the determined required confidence value. In this or these embodiments (relating to a situation referred to as a 2D case), applying said pre-scale value and sending the pre-scaled requested positioning accuracy involve: determining a horizontal accuracy $\text{Accuracy}_H=10*(1.1^{\wedge}\text{AccuracyCode}_H-1)$, where $\text{AccuracyCode}_H$ is the horizontal accuracy code included in said first control message; pre-scaling the horizontal accuracy $\text{Accuracy}_H$ into $\text{Accuracy}_{H\_PS}=\text{Accuracy}_H*v_{PS}$, where $v_{PS}$ is the pre-scale value; determining a pre-scaled horizontal accuracy code $\text{AccuracyCode}_{H\_PS}=\max([1 \quad \text{floor}(\log(1+\text{Accuracy}_{H\_PS}10)/\log(1.1))])$; and inserting the pre-scaled horizontal accuracy code $\text{AccuracyCode}_{H\_PS}$ into a second control message to be sent towards said mobile terminal in said cellular telecommunication system. Here, the second control message is a Measurement Control message which is sent over the Radio Resource Control (RRC) interface from the RNC to the mobile terminal (User Equipment, UE).

In one or more embodiments, producing a pre-scale value involves: analyzing said first control message to determine whether a horizontal accuracy code as well as a vertical accuracy code are included therein; and, if so, calculating said pre-scale value $v_{PS}$ by using the determined required confidence value $C_{Required}$ to interpolate in a table which maps a set of possible required confidence values C to a corresponding set of pre-scale values v, where the set of pre-scale values v satisfy the equation $$C = \text{erf}\left(\frac{1}{\sqrt{2}\,v}\right) - \frac{1}{v}\sqrt{\frac{2}{\pi}}\,e^{-\frac{1}{2v^2}}.$$

In this or these embodiments (relating to a situation referred to as a 3D case), applying said pre-scale value and sending the pre-scaled requested positioning accuracy involve: determining a horizontal accuracy $\text{Accuracy}_H=10*(1.1^{\wedge}\text{AccuracyCode}_H-1)$, where $\text{AccuracyCode}_H$ is the horizontal accuracy code included in said first control message; pre-scaling the horizontal accuracy $\text{Accuracy}_H$ into $\text{Accuracy}_{H\_PS}=\text{Accuracy}_H*v_{PS}$, where $v_{PS}$ is the pre-scale value; determining a pre-scaled horizontal accuracy code $\text{AccuracyCode}_{H\_PS}=\max([1 \quad \text{floor}(\log(1+\text{Accuracy}_{H\_PS}/10)/\log(1.1))])$; determining a vertical accuracy $\text{Accuracy}_V=45*(1.025^{\wedge}\text{AccuracyCode}_V-1)$, where $\text{AccuracyCode}_V$ is the vertical accuracy code included in said first control message; pre-scaling the vertical accuracy $\text{Accuracy}_V$ into $\text{Accuracy}_{V\_PS}=\text{Accuracy}_V*v_{PS}$, where $v_{PS}$ is the pre-scale value; determining a pre-scaled vertical accuracy code $\text{AccuracyCode}_{V\_PS}=\max([1 \quad \text{floor}(\log(1+\text{Accuracy}_{V\_PS}/45)/\log(1.025))])$; and inserting the pre-scaled horizontal and vertical accuracy codes $\text{AccuracyCode}_{H\_PS}$ and $\text{AccuracyCode}_{V\_PS}$ into a second control message to be sent towards said mobile terminal (2) in said cellular telecommunication system.

In one or more embodiments, producing a pre-scale value involves:

analyzing said first control message to determine whether a vertical accuracy code is included therein whereas a horizontal accuracy code is not included therein; and, if so, calculating said pre-scale value $v_{PS}$ by using the determined required confidence value $C_{Required}$ to interpolate in a table which maps a set of possible required confidence values C to a corresponding set of pre-scale values v, where the set of pre-scale values v satisfy the equation $$C = \text{erf}\left(\frac{1}{\sqrt{2}\,v}\right).$$

In this or these embodiments (relating to a situation referred to as a 1D case), applying said pre-scale value and sending the pre-scaled requested positioning accuracy involve: determining a vertical accuracy $\text{Accuracy}_V=45*(1.025^{\wedge}\text{AccuracyCode}_V-1)$, where $\text{AccuracyCode}_V$ is the vertical accuracy code included in said first control message; pre-scaling the vertical accuracy $\text{Accuracy}_V$ into $\text{Accuracy}_{V\_PS}=\text{Accuracy}_V*v_{PS}$, where $v_{PS}$ is the pre-scale value; determining a pre-scaled vertical accuracy code $\text{AccuracyCode}_{V\_PS}=\max([1 \quad \text{floor}(\log(1+\text{Accuracy}_{V\_PS}/45)/\log(1.025))])$; and inserting the pre-scaled vertical accuracy code $\text{AccuracyCode}_{V\_PS}$ into a second control message to be sent towards said mobile terminal in said cellular telecommunication system.

A second aspect of the invention is a node in a cellular telecommunication system, said node comprising a mobile terminal positioning function unit. The mobile terminal positioning function unit is configured for: determining an end user's requested positioning accuracy for the positioning of a mobile terminal in said telecommunication system; determining an estimated confidence value for the positioning of said mobile terminal; determining a required confidence value for said end user; producing a pre-scale value based on at least said estimated confidence value and said required confidence value; applying said pre-scale value to said requested positioning accuracy to obtain a pre-scaled requested positioning accuracy; and sending the pre-scaled requested positioning accuracy in said cellular telecommunication system towards said mobile terminal.

In one embodiment, the cellular telecommunication system is compliant with W-CDMA ("Wideband Code Division Multiple Access") or UMTS ("Universal Mobile Telecommunications System"), and the node is a Radio Network Controller (RNC). In another embodiment, the cellular telecommunication system is compliant with GSM, and the node is a Serving Mobile Location Center (SMLC). In yet another embodiment, the cellular telecommunication system is compliant with LTE, and the node is an Evolved Serving Mobile Location Center (E-SMLC).

A third aspect of the invention is a computer program product comprising computer program code for performing the method according to the first aspect of the invention when said computer program code is executed by a processor.

A fourth aspect of the invention is a computer readable medium having stored thereon a computer program comprising computer program code for performing the method according to the first aspect of the invention when said computer program code is executed by a processor.

Embodiments of the second to fourth aspects of the invention may generally have the same or directly corresponding features as any of the features referred to above for the first aspect.

It should be emphasized that the term "comprises/comprising" when used in this specification is taken to specify the presence of stated features, integers, steps, or components, but does not preclude the presence or addition of one or more other features, integers, steps, components, or groups thereof.

BRIEF DESCRIPTION OF THE DRAWINGS

Objects, features and advantages of embodiments of the invention will appear from the following detailed description, reference being made to the accompanying drawings, in which.

DETAILED DESCRIPTION

Figure 1:
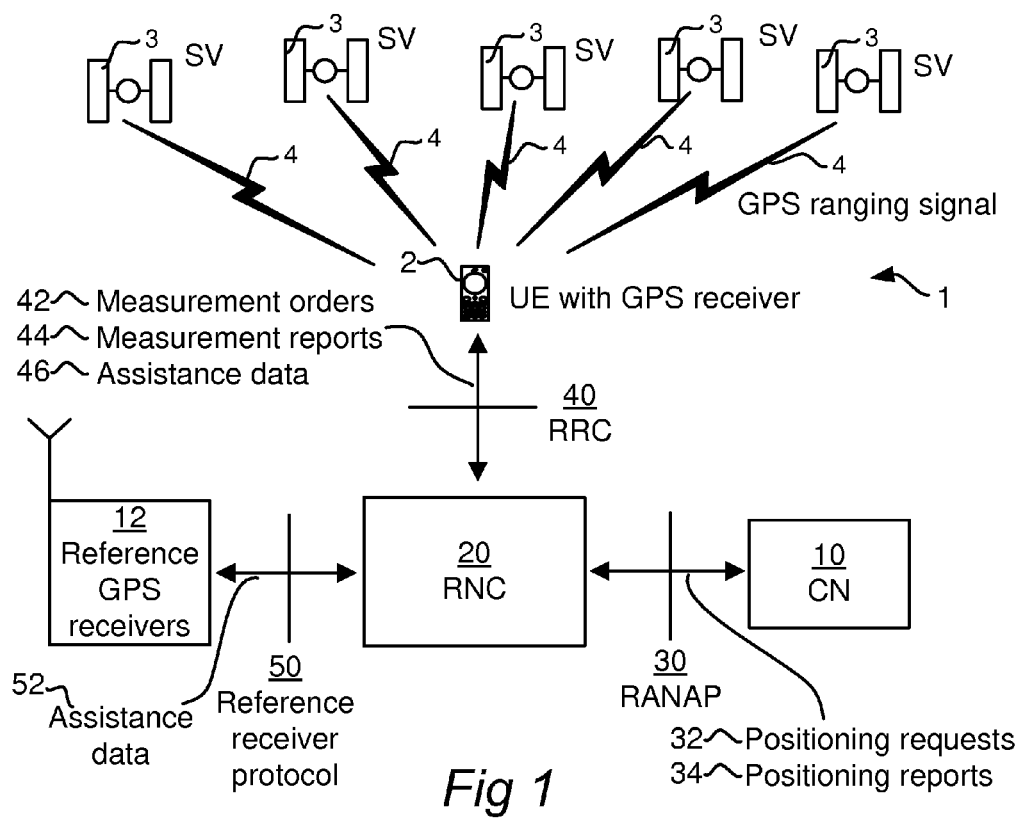
FIG. 1 is a schematic illustration of a non-limiting example of a W-CMDA (UMTS) compliant telecommunication system which is capable of performing A-GPS positioning and in which embodiments of the present invention may be exercised.

Embodiments of the invention will now be described with reference to the accompanying drawings. The invention may, however, be embodied in many different forms and should not be construed as limited to the embodiments set forth herein; rather, these embodiments are provided so that this disclosure will be thorough and complete, and will fully convey the scope of the invention to those skilled in the art. The terminology used in the detailed description of the particular embodiments illustrated in the accompanying drawings is not intended to be limiting of the invention. In the drawings, like numbers refer to like elements.

Before turning to a detailed description of the disclosed embodiments, an exemplifying environment in which they may be exercised will now be briefly described with reference to FIG. 1.

FIG. 1 illustrates a cellular telecommunications system 1 according to the familiar W-CDMA/UMTS system architecture, as defined in the 3GPP standards. Users of user equipment (UE) (i.e. mobile terminals) may use different telecommunications services, such as voice calls, Internet browsing, video calls, data calls, facsimile transmissions, still image transmissions, video transmissions, electronic messaging, and e-commerce. An individual UE 2 connects to a mobile telecommunications core network (CN) 10 over a radio link to a radio base station (also known as Node B), which in turn is connected to a radio network controller (RNC) 20. It is to be noticed that the situation in FIG. 1 has been kept on a general level in order not to obscure the disclosure in unnecessary detail. As is well known to the skilled person, there are other elements in a real W-CDMA/UMTS system, not shown in FIG. 1 or mentioned above.

The telecommunications system 1 of FIG. 1 is capable of positioning services with respect to UE:s 2 in the system. To this end, FIG. 1 illustrates the typical setup for an A-GPS environment, where telecommunications system 1 is combined with satellites 3, or space vehicles (SV), included in the GPS system. An end-user may command positioning of a particular UE 2. The CN 10 will send a positioning request 32 via the RNC 20 and further on towards the UE 2 in the form of a measurement order 42. The UE 2 will perform A-GPS positioning to determine its current position, using GPS ranging signals 4 from the satellites 3 as well as GPS assistance data 46 which has been collected by reference GPS receivers 12 and retrieved at 52 by the RNC 20. After completed A-GPS positioning, the UE 2 will send a measurement report 44 to the RNC 20, which will forward it as a positioning report 34 to the CN 10.

Figure 1A:
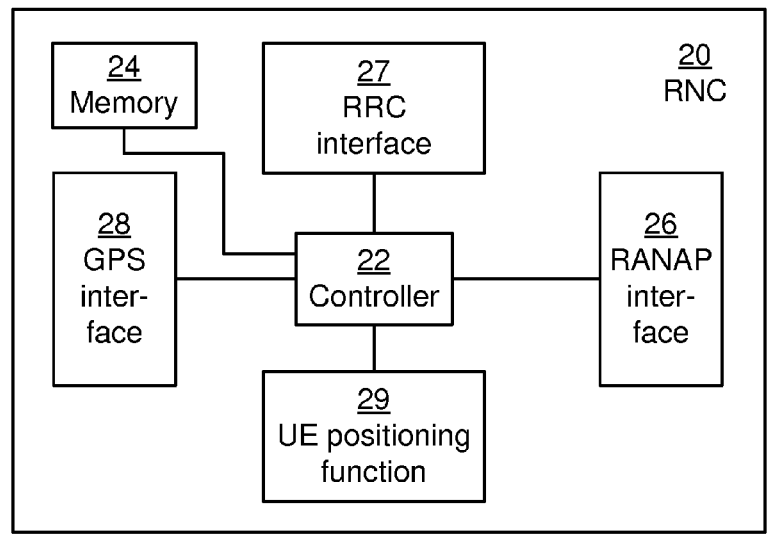
FIG. 1a is a schematic block diagram of a Radio Network Controller comprised in the telecommunication system of FIG. 1.

In FIG. 1a, a modular illustration of the RNC 20 is given. A controller 22 with associated memory 24 is responsible for the overall operation of the RNC 20. The RNC has a RANAP interface 26 for communication with the CN 10 over a Radio Access Network Application (RANAP) protocol 30. An RRC interface 27 correspondingly allows communication between the RNC 20 and the UE 2 over a Radio Resource Control (RRC) protocol 40. The RNC 20 is capable of retrieving the GPS assistance data 52 from the reference GPS receivers 12 in accordance with a reference receiver protocol 50 over a GPS interface 28.

Figure 4:
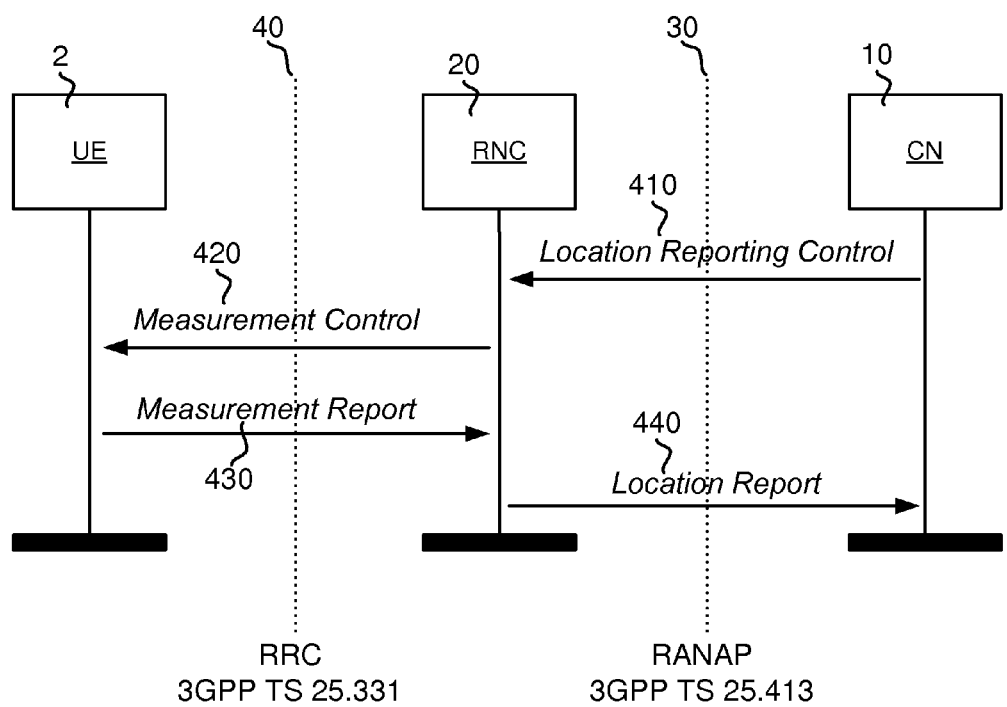
FIG. 4 is a signaling diagram illustrating some of the control and report messages which are exchanged in the telecommunication system of FIG. 1 in conjunction with A-GPS positioning.

The functionality which occurs when an end user has placed a positioning request pertaining to a certain UE 2 will now be described with reference to the signaling diagram of FIG. 4. The description will be kept on a simplified level in order not to obscure the disclosure in unnecessary detail, and will pertain to positioning accuracy-related aspects only.

Figure 2:
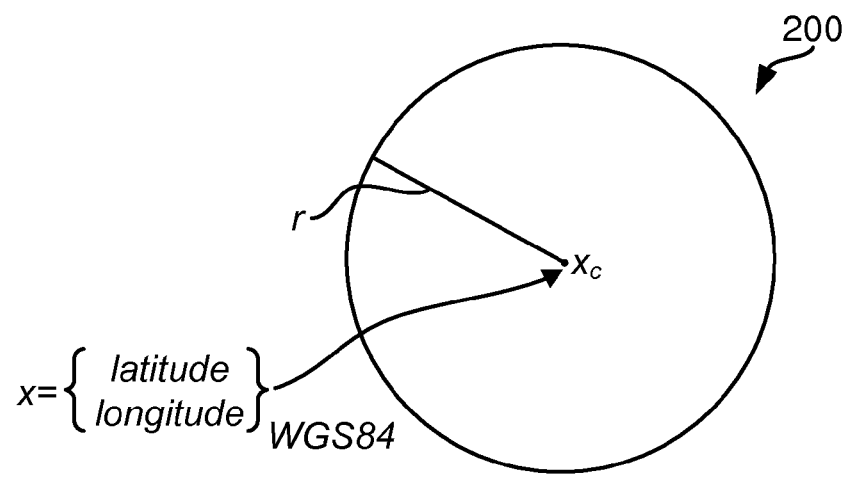
FIG. 2 illustrates the concept of an uncertainty circle for the requested positioning accuracy to be provided by a mobile terminal in A-GPS.

In the downlink, the CN 10 will send a LOCATION REPORTING CONTROL message 32, 410 over the RANAP protocol 30 to the RNC 20. In the RNC 20, the following information is obtained from the LOCATION REPORTING CONTROL message:

Accuracy code (horizontal accuracy). This is expressed as a code value (0-127) that represents the radius r of an uncertainty circle. For reference, FIG. 2 illustrates an uncertainty circle 200 with the radius r and a center point $x_c$, expressed in the reference coordinate system known as WGS 84 (World Geodetic System), which is the reference coordinate system used in GPS.

Vertical Accuracy Code (vertical accuracy). This is expressed as a code value (0-127) that represents an altitude uncertainty in meters, encoded differently than the horizontal accuracy.

Further on in the downlink, the RRC protocol 40 from the RNC 20 to the UE 2 also contains information elements in a MEASUREMENT CONTROL message 42, 420 that can transfer:

Accuracy code (horizontal accuracy). This is expressed as a code value (0-127) that represents the radius of an uncertainty circle.

Vertical Accuracy Code (vertical accuracy). This is expressed as a code value (0-127) that represents an altitude uncertainty in meters, encoded differently than the horizontal accuracy.

Upon receipt of the MEASUREMENT CONTROL message 42, 420, the GPS receiver in the UE 2 will act to determine its position and the corresponding inaccuracy. Particulars of this activity are not within the scope of the present invention and are well known to persons skilled in the art. Thus, it is sufficient within the context of the present application to note that the UE 2 measures the time of arrival of ranging signals 4 transmitted from multiple ones of the GPS satellites 3. The orbits and positions of these satellites are available with very high precision, since this information is provided to the terminal as assistance data 52, 46 in A-GPS positioning. Such assistance data 52, 46 can for instance contain trajectory models that describe the orbits of the satellites 3.

The pseudoranges measured with respect to the satellites 3 can then be combined by the UE 2 to compute its position. By doing a linearization of the nonlinear measurement geometry and treating the time measurement errors as randomly identically distributed, a covariance matrix describing the uncertainty can be calculated, said covariance matrix being the second moment of the almost Gaussian uncertainty (follows by the strong law of large numbers). This covariance matrix represents an ellipse in the 2D horizontal case and an ellipsoid in the 3D case. As will be seen below, these covariance matrices are associated with confidence values of 39% and 20%, respectively.

The UE 2 will report the outcome of its position determination in a MEASUREMENT REPORT message 44, 430 which is sent to the RNC 20. Thus, in the uplink the RNC 20 obtains the following information from the MEASUREMENT REPORT message 44, 430 received over the RRC protocol 40:

Position, position uncertainty and confidence in one of
    Ellipsoid point with uncertainty ellipse (2D),
    Ellipsoid point with altitude and uncertainty ellipsoid (3D).

Among these, the second variant is most common.

Further on in the uplink, the RANAP protocol 30 from the RNC 20 to the CN 10 also contains information elements in a LOCATION REPORT message 34, 440 that can transfer:

Position, position uncertainty and confidence in one of
    Ellipsoid point with uncertainty ellipse (2D),
    Ellipsoid point with altitude and uncertainty ellipsoid (3D).

There are more reporting formats than the ones above, which however are the most common.

Between reception of the MEASUREMENT REPORT message 44, 430 and transmission of the LOCATION REPORT message 34, 440, the RNC 20 may transform the positioning information from the reporting format as received from the UE 2 into another reporting format suitable for the end user. Such transformation may involve shape conversion for transforming a first uncertainty area shape into a second uncertainty area shape. The transformation may also be done with the intention to scale the received uncertainty so that the confidence value of the scaled uncertainty becomes equal to the confidence value that is configured for reporting to the CN, for the specific service valid for the ongoing positioning. Algorithms for such transformation and shape conversion are available from the prior art for the person skilled in the art, for instance from PCT/SE2007/050237.

However, as has already been mentioned in a previous section of the present application, a problem that has been identified with the prior art approach is that sometimes the UE 2 may determine an A-GPS position and an uncertainty that exactly match the requested horizontal and vertical accuracies which are received from the RNC 20. Normally the UE 2 then responds with a confidence value of 39% or 20% in the 2D and 3D cases, respectively. Most often the configured confidence to be reported to the end user from the RNC 20 via the CN 10 is significantly higher, in emergency positioning typically 95%. To comply with the higher confidence value, the RNC 20 therefore scales up the uncertainty region obtained from the UE 2. The result is then an uncertainty region that is larger than what was originally requested by the end user, this resulting in a failure to meet the requested QoS. This is then recorded in statistics, and also signaled to the end user. All in all, this will result in increased customer complaints.

According to the invention, this problem is addressed by the introduction of a pre-scaling of the requested horizontal and vertical inaccuracies that are received from the end user (in the disclosed embodiment, by way of the LOCATION REPORTING CONTROL message 32, 410 over the RANAP protocol 30 between the RNC 20 and the CN 10). This pre-scaling is performed in the RNC 20 and transforms the requested inaccuracies to be consistent with configured best estimates of the confidence values that are reported by the UE:s 2. The configured values could e.g. be 39% in the 2D case and 20% in the 3D case. For example, for emergency positioning this would mean that the horizontal and vertical inaccuracies would be scaled down. In the disclosed embodiment, the pre-scaled inaccuracies will be sent from the RNC 20 to the UE 2 over the RRC protocol 40 in the MEASUREMENT CONTROL message 42, 420. The UE 2 would then determine the A-GPS position, uncertainty and confidence and report this positioning information to the RNC 20. The RNC 20 then performs a shape conversion as mentioned above in order to scale up the reported uncertainty to correspond to the confidence value needed for reporting. In this case the QoS will be met, thanks to the previous pre-scaling step, and the problem is avoided.

The pre-scaling functionality of the present invention will now be described in detail. First, the pre-scaling will be derived and explained from a theoretical perspective. Then, with reference to FIG. 5 as well as Appendix 1, a description will follow of how the pre-scaling functionality may be applied in the W-CDMA/UMTS embodiment shown in FIGS. 1, 1*a* and 4.

Theoretical Description of Pre-Scaling

1. Pre-Scaling of 2D Uncertainty

The pre-scaling is performed on the radius of an uncertainty circle. To derive the pre-scaling, an uncertainty region determined by an ellipse is first used. Then, the circular uncertainty pre-scaling is obtained as a special case by setting the semi-major axis equal to the semi-minor axis. The present discussion assumes that the uncertainty codes received over the RANAP protocol 30 have been transformed to a horizontal accuracy and a vertical accuracy, respectively. Appendix 1 includes an example where all algorithms of this section are implemented in a single MATLAB program.

The result of an A-GPS report is associated with a Gaussian random error assumption. This follows since the time errors that give the ranges to the satellites can be assumed to be identically distributed. After linearizing the measurement equations, the strong law of large numbers can be applied to arrive at the conclusion that the error distribution is Gaussian.

Figure 3:
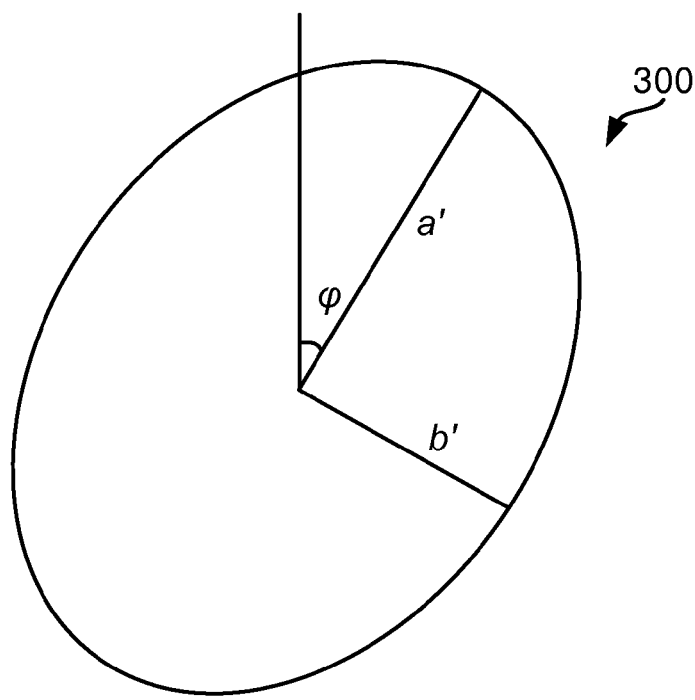
FIG. 3 illustrates a common positioning report format provided by a mobile terminal in A-GPS, involving a geometrical shape in the form of an uncertainty ellipse.

The ellipse is parameterized with semi-major axis a', semi-minor axis b' and an angle φ relative to north, counted clockwise from the semi-major axis, see FIG. 3 for details. It is clear from symmetry reasons that the angle φ does not affect the final result. The value of is therefore taken to be 0 below. The goal is hence to convert the ellipsoid confidence area at confidence level $C_{Initial}$ to a circular confidence area at confidence level $C_{Circular}$.

In order to proceed, a' and b' are then transformed into the standard deviations of a normal distribution. This is done using the following calculations, where v is the scale factor that translates from one standard deviation to $C_{Initial}$:

$$C_{Initial} = \iint_{\frac{x'^2}{a'^2}+\frac{y'^2}{b'^2} \leq 1} \frac{1}{2\pi(va')(vb')} e^{-\frac{1}{2}(x'\ y')^T \begin{pmatrix} (va')^2 & 0 \\ 0 & (vb')^2 \end{pmatrix}^{-1} \begin{pmatrix} x' \\ y' \end{pmatrix}} dx'dy'$$

$$= \iint_{x'^2+y'^2 \leq 1} \frac{1}{2\pi(va')(vb')} e^{-\frac{1}{2}(xa'\ yb')^T \begin{pmatrix} (va')^2 & 0 \\ 0 & (vb')^2 \end{pmatrix}^{-1} \begin{pmatrix} xa' \\ yb' \end{pmatrix}}$$

$$\begin{vmatrix} a' & 0 \\ 0 & b' \end{vmatrix} dxdy$$

$$= \frac{1}{2\pi} \int_0^{2\pi} \int_0^1 \frac{1}{v^2} e^{-\frac{1}{2v^2}r^2} rdrd\varsigma = 1 - e^{-\frac{1}{2v^2}},$$

from which the transformations to semi-major and semi-minor axes corresponding to a unit standard deviation follow as:

$$a = a'/\sqrt{-2\ln(1-C_{Initial})}$$

$$b = b'/\sqrt{-2\ln(1-C_{Initial})}$$

Specializing to the uncertainty radius r' results in the pre-scaling $$r = r'/\sqrt{-2\ln(1-C_{Initial})} = r' \cdot v_{PS}.$$

As will be explained in more detail later in the "Application of pre-scaling in W-CDMA/UMTS embodiment" section of the present application, the pre-scaling $v_{PS}$ represents the pre-scale value (i.e. factor or weight) with which an end user's requested positioning accuracy (horizontal and/or vertical) is to be multiplied before the thus pre-scaled requested positioning accuracy is sent further on towards a mobile terminal (e.g. UE 2). $C_{Initial}$ represents the confidence value which is required by the end user. To avoid any confusion, it is mentioned already now that in this later section, the required confidence value will be referred to as $C_{Required}$ rather than $C_{Initial}$.

The above equations apply to a case where the estimated confidence value of the positioning provided by the mobile terminal amounts to about 39%, which corresponds to unit standard deviation for the covariance matrix. Even though unit standard deviation is believed to be the prevailing alternative for the confidence values reported by existing as well as future mobile terminals, the present invention can handle also cases where it can be assumed that the mobile terminal reports at a confidence value $C_{Prescaled}$ resealed different from 39%. In such a case, the last equation above can be used backwards to compute the sought quantity, i.e $$r''=r'\sqrt{-2\ln(1-C_{\text{prescaled}})}, \text{ and then}$$

$$r=r''/\sqrt{-2\ln(1-C_{\text{Initial}})}.$$

2. Pre-Scaling of 3D Uncertainty

This case parallels the one for the 2D case in that a Gaussian 3D distribution is assumed and an ellipsoid is first considered, assuming the third principal axis being equal to the vertical inaccuracy.

This transformation builds on the transformation of the previous sub-section. Care needs to be exercised, though, since the transformation from 3D confidence values to a 3D unit covariance is different than in the 2D case. It is only at unit covariance confidence level that it is possible to extract the 2D covariance matrix of the ellipse from the 3D ellipsoid, and proceed as above. In order to derive the required relation, the calculations above are replaced by $$C_{Initial} = \iiint_{\frac{x'^2}{a'^2}+\frac{y'^2}{b'^2}+\frac{z'^2}{c'^2}\leq 1} \frac{1}{(2\pi)^{1.5}a'b'c'v^3} e^{-\frac{1}{2v^2}\left(\frac{x'^2}{a'^2}+\frac{y'^2}{b'^2}+\frac{z'^2}{c'^2}\right)} dx'dy'dz'$$

$$= \iiint_{x^2+y^2+z^2\leq 1} \frac{1}{(2\pi)^{1.5}v^3} e^{-\frac{1}{2v^2}(x^2+y^2+z^2)} dxdydz$$

$$= \int_0^{2\pi}\int_{-\frac{\pi}{2}}^{\frac{\pi}{2}}\int_0^1 \frac{1}{(2\pi)^{1.5}} r^2\cos(\psi)e^{-\frac{1}{2v^2}r^2} drd\psi d\xi = \text{erf}\left(\frac{1}{\sqrt{2}v}\right) -$$

$$\frac{1}{v}\sqrt{\frac{2}{\pi}}e^{-\frac{1}{2v^2}},$$

where c' denotes the vertical inaccuracy. The obtained equation can be solved numerically for a set of given $C_{Initial}$, resulting in a corresponding set of v, generating a table as exemplified in Table 1. This table gives v for a given $C_{Initial}$, from which the unit covariance ellipsoid axes follow as a=va', b=vb' and c=vc'. In order to obtain a high accuracy, interpolation in the table is utilized, as exemplified by the MATLAB code in appendix 1. Also in this case, a backward interpolation can be used to compute scale factors other than for the unit covariance level.

TABLE 1

| pre-scaling 3D | |
|---|---|
| $C_{Initial}$ | v |
| 0.9989 | 0.2500 |
| 0.9947 | 0.2806 |
| 0.9821 | 0.3150 |
| 0.9540 | 0.3536 |
| 0.9042 | 0.3969 |
| 0.8311 | 0.4454 |
| 0.7385 | 0.5000 |
| 0.6345 | 0.5612 |
| 0.5283 | 0.6300 |
| 0.4276 | 0.7071 |
| 0.3378 | 0.7937 |
| 0.2613 | 0.8909 |
| 0.1987 | 1.0000 |
| 0.1490 | 1.1225 |
| 0.1105 | 1.2599 |
| 0.0811 | 1.4142 |
| 0.0591 | 1.5874 |

TABLE 1-continued

| pre-scaling 3D | |
|---|---|
| $C_{Initial}$ | v |
| 0.0428 | 1.7818 |
| 0.0309 | 2.0000 |
| 0.0222 | 2.2449 |
| 0.0159 | 2.5198 |
| 0.0113 | 2.8284 |
| 0.0081 | 3.1748 |
| 0.0057 | 3.5636 |
| 0.0041 | 4.0000 |

3. Pre-Scaling of 1D Uncertainty

In this case the 1-dimensional Gaussian distribution is used for scaling corresponding to 68%. The case is applicable in the exceptional situation where only vertical inaccuracy is pre-scaled. The calculations are as follows:

$$C_{Initial} = \int_{-r}^{r} \frac{1}{\sqrt{2\pi}\,vr} e^{-\frac{1}{2}\frac{x'^2}{v^2 r^2}} dx'$$

$$= \frac{1}{\sqrt{2\pi}\,v} \int_{-1}^{1} e^{-\frac{1}{2}\frac{x^2}{v^2}} dx$$

$$= \text{erf}\left(\frac{1}{\sqrt{2}\,v}\right)$$

This equation cannot be solved analytically either—hence the solution using a table as in the 3D case is used. For the 1D case the table becomes:

TABLE 2

| pre-scaling 1D | |
|---|---|
| $C_{Initial}$ | v |
| 0.9957 | 0.3500 |
| 0.9760 | 0.4430 |
| 0.9255 | 0.5607 |
| 0.8412 | 0.7097 |
| 0.7344 | 0.8982 |
| 0.6209 | 1.1369 |
| 0.5129 | 1.4390 |
| 0.4170 | 1.8213 |
| 0.3356 | 2.3052 |
| 0.2682 | 2.9177 |
| 0.2134 | 3.6929 |
| 0.1694 | 4.6742 |
| 0.1342 | 5.9161 |
| 0.1062 | 7.4880 |
| 0.0840 | 9.4775 |
| 0.0664 | 11.9957 |
| 0.0525 | 15.1829 |
| 0.0415 | 19.2170 |
| 0.0328 | 24.3230 |
| 0.0259 | 30.7856 |
| 0.0205 | 38.9653 |
| 0.0162 | 49.3183 |
| 0.0128 | 62.4222 |
| 0.0101 | 79.0077 |
| 0.0080 | 100.0000 |

Application of Pre-Scaling in W-CDMA/UMTS Embodiment

Figure 5:
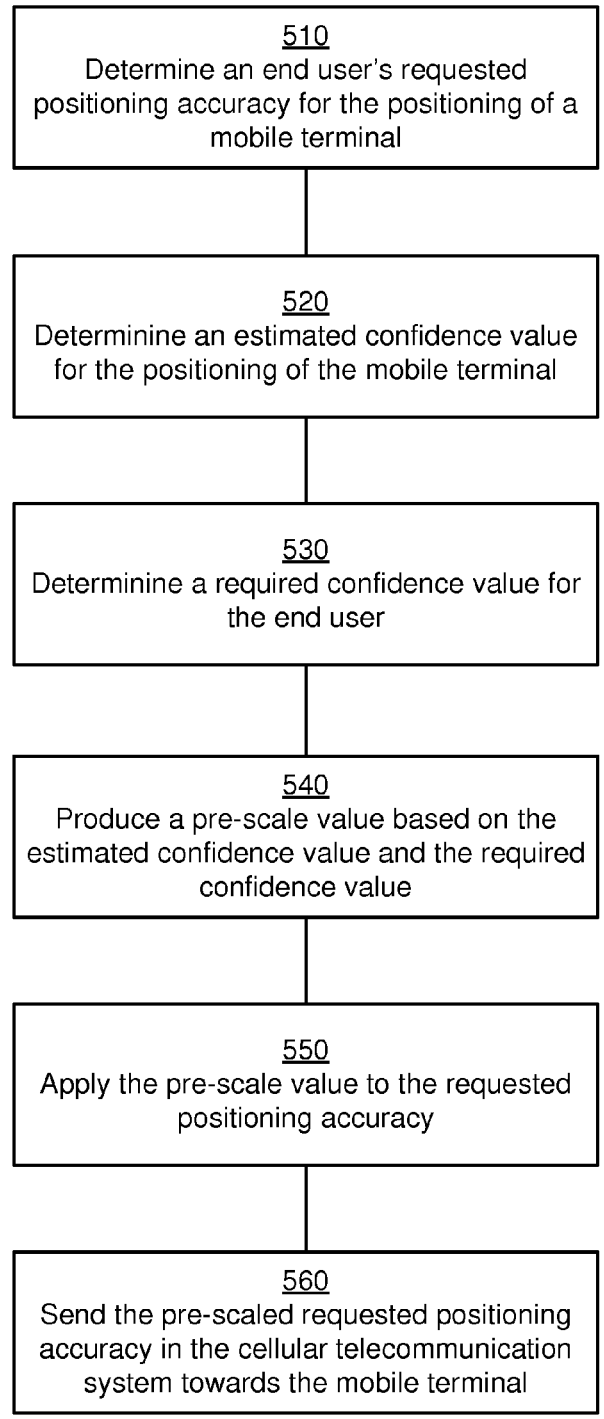
FIG. 5 illustrates a method according to an embodiment of the invention for pre-scaling of requested accuracies in A-GPS.

The theoretical derivation of the pre-scaling functionality may for instance be applied in the W-CDMA/UMTS embodiment which has been described above with reference to FIGS. 1, 1a and 4. The steps of the pre-scaling method shown in FIG. 5 are performed by the UE positioning function 29 in the RNC 20 after having received the LOCATION REPORTING CONTROL message 410 from the CN 10. A software implementation of the pre-scaling method is given in Appendix 1. It is to be observed that the method shown in FIG. 5 is divided in steps which do not necessarily have to be performed in the exact order shown, or as separate steps even though this is the case in FIG. 5. Therefore, the reader should not be surprised by the fact that the software implementation given in Appendix 1 does not exhibit exactly the same division of functional steps as are shown in FIG. 5.

In a first step 510 of the pre-scaling method shown in FIG. 5, the end user's requested positioning accuracy for the positioning of the UE 2 is determined. In more detail, the RNC 20 determines at least one accuracy code included in the LOCATION REPORTING CONTROL message 410. Particulars of the LOCATION REPORTING CONTROL message are defined in the specification 3GPP, TS25.413, "UTRAN Iu interface RANAP signalling", which is available for instance at http://www.3gpp.org. A horizontal accuracy code represents a radius r of an uncertainty circle 200 (see FIG. 2), whereas a vertical accuracy code represents an altitude.

A situation where only a horizontal accuracy code is included in the LOCATION REPORTING CONTROL message 410 (specifying a radius of an uncertainty circle only) is referred to as a 2D case. A 3D case is when both a horizontal and a vertical accuracy code are included in the message 410 (specifying a radius of an uncertainty circle as well as an altitude). A 1D case is when only a vertical accuracy code is included in the message 410 (specifying an altitude only).

Pursuant to the aforementioned specification 3GPP, TS25.413, for a horizontal accuracy code $AccuracyCode_H$, the corresponding requested horizontal accuracy may be calculated in step 510 as $$Accuracy_H = 10 * (1.1 \wedge AccuracyCode_H - 1).$$

Conversely, for a vertical accuracy code $AccuracyCode_V$ the corresponding requested vertical accuracy may be calculated in step 510 as $$Accuracy_V = 45 * (1.025 \wedge AccuracyCode_V - 1).$$

Then, in a second step 520 an estimated confidence value for the positioning of the mobile terminal is determined. In more detail, this involves analyzing the LOCATION REPORTING CONTROL message 410 for the presence of a horizontal accuracy code and/or a vertical accuracy code, the outcome of which will indicate whether the received message 410 pertains to a 1D, 2D or 3D case. Based upon the analyzing, the estimated confidence value may then be selected from a plurality of configured best estimates of confidences values known to be reported by UE:s 2 in the cellular telecommunication system 1. The configured best estimates of confidences values preferably correspond to unit standard deviation for the covariance matrix, as has already been explained above in the theoretical section. Thus, the configured best estimates of confidences values may preferably be 39% in the 2D case, 20% in the 3D case, and 68% in the 1D case.

In a third step 530, a required confidence value for the end user is determined. In the disclosed embodiment, this involves analyzing the received LOCATION REPORTING CONTROL message 410 to determine a service class of the end user; and determining the required confidence value based on the determined service class. More specifically, this pertains to reading the Client Type IE included in the message 410, and using a cross-reference table to map the read Client Type IE into the required confidence value. To this end, the cross-reference table contains a list which maps all or some of the different possible Client Type IE values (e.g. Emergency Services, Value Added Services, PLMN Operator Services, Lawful Intercept Services, PLMN Operator Broadcast Services, PLMN Operator Operation and Maintenance Services, PLMN Operator Anonymous Statistics Services, PLMN Operator Target MS Services Support) into corresponding required confidence values between 0 and 100%. For instance, Emergency Services may be mapped to a required confidence value of 95%.

Once the estimated confidence value and required confidence value have been determined in steps 520 and 530, the method will proceed to step 540, in which a pre-scale value is produced from these pieces of input data. Below are descriptions which are applicable to the preferred situation when the estimated confidence value corresponds to unit covariance level, for the 2D, 3D and 1D cases. However, as has been explained in the theoretical section, the equations given therein may also be used in order to calculate an estimated confidence value in a situation where the UE 2 can be expected to provide its positioning report with another confidence than what corresponds to unit covariance level.

In the 2D case, step 540 involves calculating the pre-scale value $v_{PS}$ as $1/\sqrt{(-2*\log(1-C_{Required})}$, where $C_{Required}$ is the determined required confidence value (such as 95% when Client Type IE=Emergency Services).

In the 3D case, step 540 involves calculating the pre-scale value $v_{PS}$ by using the determined required confidence value $C_{Required}$ to t interpolate in a table which maps a set of possible required confidence values to a corresponding set of pre-scale values—for instance Table 1 as listed above in the theoretical section.

Conversely, in the 1D case, step 540 involves calculating the pre-scale value $v_{PS}$ by using the determined required confidence value $C_{Required}$ to interpolate in a table which maps a set of possible required confidence values to a corresponding set of pre-scale values—for instance Table 2 as listed above in the theoretical section.

In step 550, the calculated pre-scale value from step 540 is applied to the requested positioning accuracy from step 510. Then, in step 560, the pre-scaled requested positioning accuracy is sent in the cellular telecommunication system 1 towards the UE 2.

In the 2D case, steps 550 and 560 involve pre-scaling the horizontal accuracy $Accuracy_H$ into $Accuracy_{H\_PS} = Accuracy_H * v_{PS}$, where $v_{PS}$ is the calculated pre-scale value. Then, a pre-scaled horizontal accuracy code $AccuracyCode_{H\_PS}$ is determined as $\max([1\ \text{floor}(\log(1+Accuracy_{H\_PS}/10)/\log(1.1))])$. Finally, the pre-scaled horizontal accuracy code $AccuracyCode_{H\_PS}$ is inserted into the MEASUREMENT CONTROL message 420 to be sent towards the UE 2. Particulars of the MEASUREMENT CONTROL message are defined in the specification 3GPP, TS 25.331, "Radio Resource Control (RRC)", which is available for instance at http://www.3gpp.org.

In the 3D case, steps 550 and 560 involve pre-scaling the horizontal accuracy $Accuracy_H$ into $Accuracy_{H\_PS} = Accuracy_H * v_{PS}$, where $v_{PS}$ is the calculated pre-scale value. Then, a pre-scaled horizontal accuracy code $AccuracyCode_{H\_PS}$ is determined as $\max([1\ \text{floor}(\log(1+Accuracy_{H\_PS}/10)/\log(1.1))])$. Correspondingly, the vertical accuracy $Accuracy_V$ is pre-scaled into $Accuracy_{V\_PS} = Accuracy_V * v_{PS}$, where $v_{PS}$ is the calculated pre-scale value, and a pre-scaled vertical accuracy code $AccuracyCode_{V\_PS}$ is determined as $\max([1\ \text{floor}(\log(1+Accuracy_{V\_PS}/45)/\log(1.025))])$. Finally, the pre-scaled horizontal and vertical accuracy codes $AccuracyCode_{H\_PS}$ and $AccuracyCode_{V\_PS}$ are inserted into the MEASUREMENT CONTROL message 420 to be sent towards the UE 2.

In the 1D case, steps 550 and 560 involve pre-scaling the vertical accuracy Accuracy$_V$ into Accuracy$_{V\_PS}$=Accuracy$_V$*v$_{PS}$, where v$_{PS}$ is the calculated pre-scale value. Then, a pre-scaled vertical accuracy code AccuracyCode$_{V\_PS}$ is determined as max([1 floor(log(1+Accuracy$_{V\_PS}$/45)/log (1.025))]). Finally, the pre-scaled vertical accuracy code AccuracyCode$_{V\_PS}$ is inserted into the MEASUREMENT CONTROL message 420 to be sent towards the UE 2.

The pre-scaling method described above with reference to FIG. 5 and Appendix 1 may be embodied as a computer program product comprising computer program code for performing the method when the computer program code is executed by a processor, such as the controller 22 in the RNC 20 of FIG. 2. The pre-scaling method may also be embodied as a computer readable medium having stored thereon a computer program comprising computer program code for performing the method when the computer program code is executed by a processor. The processor may for instance be the controller 22 in the RNC 20 of FIG. 2. The computer readable medium may for instance be the memory 24 in the RNC 20 of FIG. 2, or another plausible medium including but not limited to an optical disc (e.g. CD or DVD), a portable semi-conductor memory (e.g. USB stick), a magnetic disc, or a file server accessible in a computer network such as the Internet.

The invention has been described above in detail with reference to embodiments thereof. However, as is readily understood by those skilled in the art, other embodiments are equally possible within the scope of the present invention, as defined by the appended claims.

APPENDIX 1

```
%%%%%%%%%%%%%%%%%%%%%%%%%%%%%%%%%%%%%%%%
%%%%%%%%%%%%%%%%%%%%%%%%%%%%%%%%%%%%%%%%
%%%%%%%%%%%%%%%%%%%%%%%%%%%%%%%%%%%%%%
%
% Description:
% This script computes the rescaled horizontal and vertical
% inaccuracies requested by the UE when it performs a UE-based A-GPS
% positioning.
%
% Date: 2009-10-10.
%
%%%%%%%%%%%%%%%%%%%%%%%%%%%%%%%%%%%%%%%%
%%%%%%%%%%%%%%%%%%%%%%%%%%%%%%%%%%%%%%%%
%%%%%%%%%%%%%%%%%%%%%%%%%%%%%%%%%%%%%
ready = 0; % Trick to allow breakout of while loop in case of
measurement failure
while (~ready) % MATLAB technical - replaces if-condition in NDS.
Need a while loop to allow for break. C++ implementation may be
different
    %
    % Selection of scaling case. Rule is that defaults are not
    % pre-scaled, only incoming QoS requests from the CN.
    %
    if (~exist('accuracyCodeLRC')
& ~exist('verticalAccuracyCodeLRC')) % No pre-scaling
        prescalingCase = 0;
    elseif (exist('accuracyCodeLRC') &
~exist('verticalAccuracyCodeLRC')) % 2D Pre-scaling of horizontal
inaccuracy
        prescalingCase = 1;
    elseif (~exist('accuracyCodeLRC') &
exist('verticalAccuracyCodeLRC')) % 1D Pre-scaling of vertical
inaccuracy
        accuracyCodeLRC = horizontalAccuracyDefault;
        prescalingCase = 2;
    else % 3D Pre-scaling of horizontaland vertical inaccuracy
        prescalingCase = 3;
    end
    %
    % Selection of confidencies
    %
```

APPENDIX 1-continued

```
    if (serviceClass == 0)
        inputConfidence = assumedInputConfidenceEmergency;
% Emergency service class
    elseif (serviceClass == 1)
        inputConfidence = assumedInputConfidenceCommercial1; %
Commercial service class 1
    elseif (serviceClass == 2)
        inputConfidence = assumedInputConfidenceCommercial2; %
Commercial service class 2
    else
    end
    %
    % Pre-scaling case 0
    %
    if (prescalingCase == 0) % No pre-scaling since default values are
used
        prescaledHorizontalAccuracyCode = horizontalAccuracyDefault;
        prescaledVerticalAccuracyCode = verticalAccuracyDefault;
    end
    %
    % Prescaling case 1, only 2D inaccuracy is requested, therefore a
2D
    % pre-scaling is performed
    %
    if (prescalingCase == 1)
        horizontalAccuracy = 10*(1.1^accuracyCodeLRC-1);
        prescaledHorizontalAccuracy =
horizontalAccuracy/sqrt(-2*log(1- inputConfidence));
        prescaledHorizontalAccuracyCode = max([1
floor(log(1+prescaledHorizontalAccuracy/10)/log(1.1))]);
        prescaledVerticalAccuracyCode = verticalAccuracyDefault;
    end
    %
    % Prescaling case 2, only 1D inaccuracy is requested, therefore a
1D
    % prescaling is performed
    %
    if (prescalingCase == 2)
        prescaledHorizontalAccuracyCode = horizontalAccuracyDefault;
        % Need to find scale factor by interpolation in the
        % confidenceScaleFactor1D tableconfidence
        % First search for the interval where the input confidence is
found
        for i=1:24
            if (confidenceScaleFactor1D(i,1)>inputConfidence) &
(confidenceScaleFactor1D(i+1,1)<=inputConfidence) % Interval found
                confidenceLowIndex = i;
                confidenceHighIndex = i+1;
            end
        end
        % Then interpolate
        scaleFactor1D =
confidenceScaleFactor1D(confidenceLowIndex,2)+
(confidenceScaleFactor1D(confidenceHighIndex,2)-
confidenceScaleFactor1D(confidenceLowIndex,2))/
(confidenceScaleFactor1D(confidenceHighIndex,1)-
confidenceScaleFactor1D(confidenceLowIndex,1))*(inputConfidence-
confidenceScaleFactor1D(confidenceLowIndex,1));
        % Finally, compute the result
        verticalAccuracy = 45*(1.025^verticalAccuracyCodeLRC-1);
        prescaledVerticalAccuracy = scaleFactor1D*verticalAccuracy;
        prescaledVerticalAccuracyCode = max([1
floor(log(1+prescaledVerticalAccuracy/45)/log(1.025))]);
    end
    %
    % Prescaling case 3, 3D inaccuracy is requested, therefore a 3D
prescaling is performed
    %
    if (prescalingCase == 3)
        % Need to find scale factor by interpolation in the
        % confidenceScaleFactor1D tableconfidence
        % First search for the interval where the input confidence is
found
        for i=1:24
            if (confidenceScaleFactor3D(i,1)>inputConfidence) &
(confidenceScaleFactor3D(i+1,1)<=inputConfidence) % Interval found
                confidenceLowIndex = i;
                confidenceHighIndex = i+1;
            end
        end
```

APPENDIX 1-continued

```
        % Then interpolate
        scaleFactor3D =
confidenceScaleFactor3D(confidenceLowIndex,2)+
(confidenceScaleFactor3D(confidenceHighIndex,2)-
confidenceScaleFactor3D(confidenceLowIndex,2))/
(confidenceScaleFactor3D(confidenceHighIndex,1)-
confidenceScaleFactor3D(confidenceLowIndex,1))*(inputConfidence-
confidenceScaleFactor3D(confidenceLowIndex,1));
        % Finally, compute the result
        horizontalAccuracy = 10*(1.1^accuracyCodeLRC-1);
        prescaledHorizontalAccuracy =
scaleFactor3D*horizontalAccuracy;
        prescaledHorizontalAccuracyCode = max([1
floor(log(1+prescaledHorizontalAccuracy/10)/log(1.1))]);
        verticalAccuracy = 45*(1.025^verticalAccuracyCodeLRC-1);
        prescaledVerticalAccuracy = scaleFactor3D*verticalAccuracy;
        prescaledVerticalAccuracyCode = max([1
floor(log(1+prescaledVerticalAccuracy/45)/log(1.025))]);
    end
    % end of loop
    ready = 1; % To finalize the (formal) while loop that enables
break outs in case of failures
end % End of RTT Positioning calculation
```

The invention claimed is:

1. A method in conjunction with positioning of a mobile terminal in a cellular telecommunication system, the method comprising:

determining an end user's requested positioning accuracy for the positioning of said mobile terminal, by receiving a first control message in a node of said cellular telecommunication system, said first control message representing a request from said end user for a positioning report pertaining to said mobile terminal, and determining at least one accuracy code included in said first control message, wherein the or each determined accuracy code represents a radius of an uncertainty circle or an altitude;

determining an estimated confidence value for the positioning of said mobile terminal;

determining a required confidence value for said end user;

producing a pre-scale value based on at least said estimated confidence value and said required confidence value, by analyzing said first control message to determine that a horizontal accuracy code is included therein and a vertical accuracy code is not included therein and, in response thereto, calculating said pre-scale value $v_{PS}$ as $1/\text{sqrt}(-2*\log(1-C_{Required}))$, where $C_{Required}$ is the determined required confidence value;

applying said pre-scale value to said requested positioning accuracy to obtain a pre-scaled requested positioning accuracy; and sending the pre-scaled requested positioning accuracy in said cellular telecommunication system towards said mobile terminal.

2. The method according to claim 1, wherein determining the estimated confidence value for the positioning of said mobile terminal comprises:

analyzing said first control message to determine whether a horizontal accuracy code is included therein, and whether a vertical accuracy code is included therein; and based upon said analyzing, selecting said estimated confidence value from a plurality of configured best estimates of confidences values known to be reported by mobile terminals in the cellular telecommunication system.

3. The method according to claim 1, wherein determining the required confidence value comprises:

analyzing said first control message to determine a service class of said end user; and determining said required confidence value based on the determined service class.

4. The method according to claim 3, wherein determining the required confidence value further comprises:

reading a client type included in said first control message; and using a cross-reference table to map the client type into said required confidence value.

5. The method according to claim 1, wherein applying said pre-scale value and sending the pre-scaled requested positioning accuracy comprises:

determining a horizontal accuracy $\text{Accuracy}_H = 10*(1.1^{\text{AccuracyCode}_H}-1)$, where $\text{AccuracyCode}_H$ is the horizontal accuracy code included in said first control message;

pre-scaling the horizontal accuracy $\text{Accuracy}_H$ into $\text{Accuracy}_{H\_PS} = \text{Accuracy}_H * v_{PS}$, where $v_{PS}$ is the pre-scale value;

determining a pre-scaled horizontal accuracy code $\text{AccuracyCode}_{H\_PS} = \max([1\ \text{floor}(\log(1+\text{Accuracy}_{H\_PS}/10)/\log(1.1))])$; and inserting the pre-scaled horizontal accuracy code $\text{AccuracyCode}_{H\_PS}$ into a second control message to be sent towards said mobile terminal in said cellular telecommunication system.

6. A method in conjunction with positioning of a mobile terminal in a cellular telecommunication system, the method comprising:

determining an end user's requested positioning accuracy for the positioning of said mobile terminal, by receiving a first control message in a node of said cellular telecommunication system, said first control message representing a request from said end user for a positioning report pertaining to said mobile terminal, and determining at least one accuracy code included in said first control message, wherein the or each determined accuracy code represents a radius of an uncertainty circle or an altitude;

determining an estimated confidence value for the positioning of said mobile terminal;

determining a required confidence value for said end user;

producing a pre-scale value based on at least said estimated confidence value and said required confidence value, by analyzing said first control message to determine whether a horizontal accuracy code as well as a vertical accuracy code are included therein and, if so, calculating said pre-scale value $v_{PS}$ by using the determined required confidence value $C_{Required}$ to interpolate in a table which maps a set of possible required confidence values C to a corresponding set of pre-scale values v, where the set of pre-scale values v satisfy the equation $$C = \text{erf}\left(\frac{1}{\sqrt{2}\,v}\right) - \frac{1}{v}\sqrt{\frac{2}{\pi}}\,e^{-\frac{1}{2v^2}};$$

applying said pre-scale value to said requested positioning accuracy to obtain a pre-scaled requested positioning accuracy; and sending the pre-scaled requested positioning accuracy in said cellular telecommunication system towards said mobile terminal.

7. The method according to claim 6, wherein applying said pre-scale value and sending the pre-scaled requested positioning accuracy comprises:

determining a horizontal accuracy $\text{Accuracy}_H=10*(1.1^{\wedge}\text{AccuracyCode}_H-1)$, where $\text{AccuracyCode}_H$ is the horizontal accuracy code included in said first control message;

pre-scaling the horizontal accuracy $\text{Accuracy}_H$ into $\text{Accuracy}_{H\_PS}=\text{Accuracy}_H*v_{PS}$, where $v_{PS}$ is the pre-scale value;

determining a pre-scaled horizontal accuracy code $\text{AccuracyCode}_{H\_PS}=\max([1\ \text{floor}(\log(1+\text{Accuracy}_{H\_PS}/10)/\log(1.1))])$;

determining a vertical accuracy $\text{Accuracy}_V=45*(1.025^{\wedge}\text{AccuracyCode}_V-1)$, where $\text{AccuracyCode}_V$ is the vertical accuracy code included in said first control message;

pre-scaling the vertical accuracy $\text{Accuracy}_V$ into $\text{Accuracy}_{V\_PS}=\text{Accuracy}_V*v_{PS}$, where $v_{PS}$ is the pre-scale value;

determining a pre-scaled vertical accuracy code $\text{AccuracyCode}_{V\_PS}=\max([1\ \text{floor}(\log(1+\text{Accuracy}_{V\_PS}/45)/\log(1.025))])$; and inserting the pre-scaled horizontal and vertical accuracy codes $\text{AccuracyCode}_{H\_PS}$ and $\text{AccuracyCode}_{V\_PS}$ into a second control message to be sent towards said mobile terminal in said cellular telecommunication system.

8. A method in conjunction with positioning of a mobile terminal in a cellular telecommunication system, the method comprising:

determining an end user's requested positioning accuracy for the positioning of said mobile terminal, by receiving a first control message in a node of said cellular telecommunication system, said first control message representing a request from said end user for a positioning report pertaining to said mobile terminal, and determining at least one accuracy code included in said first control message, wherein the or each determined accuracy code represents a radius of an uncertainty circle or an altitude;

determining an estimated confidence value for the positioning of said mobile terminal;

determining a required confidence value for said end user;

producing a pre-scale value based on at least said estimated confidence value and said required confidence value, by analyzing said first control message to determine that a vertical accuracy code is included therein and a horizontal accuracy code is not included therein and, in response thereto, calculating said pre-scale value $v_{PS}$ by using the determined required confidence value $C_{Required}$ to interpolate in a table which maps a set of possible required confidence values C to a corresponding set of pre-scale values v, where the set of pre-scale values v satisfy the equation $$C = \text{erf}\left(\frac{1}{\sqrt{2}\,v}\right);$$

applying said pre-scale value to said requested positioning accuracy to obtain a pre-scaled requested positioning accuracy; and sending the pre-scaled requested positioning accuracy in said cellular telecommunication system towards said mobile terminal.

9. The method according to claim 8, wherein applying said pre-scale value and sending the pre-scaled requested positioning accuracy comprises:

determining a vertical accuracy $\text{Accuracy}_V=45*(1.025^{\wedge}\text{AccuracyCode}_V-1)$, where $\text{AccuracyCode}_V$ is the vertical accuracy code included in said first control message;

pre-scaling the vertical accuracy $\text{Accuracy}_V$ into $\text{Accuracy}_{V\_PS}=\text{Accuracy}_V*v_{PS}$, where $v_{PS}$ is the pre-scale value;

determining a pre-scaled vertical accuracy code $\text{AccuracyCode}_{V\_PS}=\max([1\ \text{floor}(\log(1+\text{Accuracy}_{V\_PS}/45)/\log(1.025))])$; and inserting the pre-scaled vertical accuracy code $\text{AccuracyCode}_{V\_PS}$ into a second control message to be sent towards said mobile terminal in said cellular telecommunication system.

10. A node in a cellular telecommunication system, said node comprising a mobile terminal positioning function unit, said mobile terminal positioning function unit is configured for:

determining an end user's requested positioning accuracy for the positioning of a mobile terminal in said telecommunication system, by receiving a first control message in a node of said cellular telecommunication system, said first control message representing a request from said end user for a positioning report pertaining to said mobile terminal, and determining at least one accuracy code included in said first control message, wherein the or each determined accuracy code represents a radius of an uncertainty circle or an altitude;

determining an estimated confidence value for the positioning of said mobile terminal;

determining a required confidence value for said end user;

producing a pre-scale value based on at least said estimated confidence value and said required confidence value, by analyzing said first control message to determine that a horizontal accuracy code is included therein and a vertical accuracy code is not included therein and, in response thereto, calculating said pre-scale value $V_{PS}$ as $1/\text{sqrt}(-2*\log(1-C_{Required}))$, where $C_{Required}$ is the determined required confidence value;

applying said pre-scale value to said requested positioning accuracy to obtain a pre-scaled requested positioning accuracy; and sending the pre-scaled requested positioning accuracy in said cellular telecommunication system towards said mobile terminal.

11. The node according to claim 10, wherein the cellular telecommunication system is compliant with W-CDMA or UMTS, and the node is a Radio Network Controller (RNC).

12. The node according to claim 10, wherein the cellular telecommunication system is compliant with GSM, and the node is a Serving Mobile Location Center (SMLC).

13. The node according to claim 10, wherein the cellular telecommunication system is compliant with LTE, and the node is an Evolved Serving Mobile Location Center (E-SMLC).

* * * * *

UNITED STATES PATENT AND TRADEMARK OFFICE
CERTIFICATE OF CORRECTION

PATENT NO. : 8,923,886 B2  
APPLICATION NO. : 13/810522  
DATED : December 30, 2014  
INVENTOR(S) : Wigren et al.

Page 1 of 2

It is certified that error appears in the above-identified patent and that said Letters Patent is hereby corrected as shown below:

On the Title Page, in the Figure, in Box "520", in Line 1, delete "Determinine" and insert -- Determine --, therefor.

On the Title Page, in the Figure, in Box "530", in Line 1, delete "Determinine" and insert -- Determine --, therefor.

On the Title Page, in item (56), under "OTHER PUBLICATIONS", in Column 1, Line 6, delete "org/ftp/specs_/html-info/25305.htm;" and insert -- org/ftp/specs/html-info/25305.htm; --, therefor.

On Page 2, in item (56), under "OTHER PUBLICATIONS", in Column 1, Line 2, delete "Specificaiton Gropu" and insert -- Specification Group --, therefor.

In the Drawings

In Fig. 1, Sheet 1 of 4, delete "FIG" and insert -- FIG. --, therefor at each occurrence throughout the figures (Figs. 1a-5).

In Fig. 5, Sheet 4 of 4, in Box "520", in Line 1, delete "Determinine" and insert -- Determine --, therefor.

In Fig. 5, Sheet 4 of 4, in Box "530", in Line 1, delete "Determinine" and insert -- Determine --, therefor.

In the Specification

In Column 3, Line 54, delete "(LPPa)" and insert -- (LPPA) --, therefor.

Signed and Sealed this  
Twenty-third Day of February, 2016

Michelle K. Lee  
*Director of the United States Patent and Trademark Office*

CERTIFICATE OF CORRECTION (continued)
U.S. Pat. No. 8,923,886 B2

In Column 4, Line 42, delete "floor(log(1+AccuracyH_PS10)/log" and insert -- floor(log(1+AccuracyH_PS/10)/log --, therefor.

In Column 7, Line 23, delete "UE:s" and insert -- UEs --, therefor.

In Column 7, Line 65, delete "xc," and insert -- xc --, therefor.

In Column 9, Line 37, delete "UE:s" and insert -- UEs --, therefor.

In Column 10, Line 13, delete "value of" and insert -- value of φ --, therefor.

In Column 10, Line 44, delete "$b = b' \sqrt{-2\ln(1-C_{Initial})}$" and insert -- $b = b' / \sqrt{-2\ln(1-C_{Initial})}$ . --, therefor.

In Column 11, Line 2, delete "resealed different" and insert -- different --, therefor.

In Column 11, Line 6, delete "$r'' = r'\sqrt{-2\ln(1-C_{prescaled})},$" and insert -- $r'' = r' / \sqrt{-2\ln(1-C_{prescaled})},$ --, therefor.

In Column 11, Line 26, delete "$= \iiint_{x^2+y^2+z^2 \leq 1} \frac{1}{(2\pi)^{1.5} v^3} e^{-\frac{1}{2v^2}(x'+y^2+z^2)} dx\, dy\, dz$" and insert -- $= \iiint_{x^2+y^2+z^2 \leq 1} \frac{1}{(2\pi)^{1.5} v^3} e^{-\frac{1}{2v^2}(x^2+y^2+z^2)} dx\, dy\, dz$ --, therefor.

In Column 12, Line 26, delete "$= \mathrm{erf}\left(\frac{1}{\sqrt{2}\, v}\right)$" and insert -- $= \mathrm{erf}\left(\frac{1}{\sqrt{2}\, v}\right)$ . --, therefor.

In Column 13, Line 49, delete "UE:s" and insert -- UEs --, therefor.

In Column 14, Line 27, delete "t interpolate" and insert -- interpolate --, therefor.

In the Claims

In Column 19, Line 36, in Claim 8, delete "altitude," and insert -- altitude; --, therefor.